United States Patent
Zhang

(10) Patent No.: US 11,570,520 B2
(45) Date of Patent: Jan. 31, 2023

(54) METHOD FOR DATA PROCESSING AND LIVE BROADCAST SYSTEM

(71) Applicant: BEIJING DAJIA INTERNET INFORMATION TECHNOLOGY CO., LTD., Beijing (CN)

(72) Inventor: Yang Zhang, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/439,384

(22) PCT Filed: Nov. 19, 2020

(86) PCT No.: PCT/CN2020/130224
§ 371 (c)(1),
(2) Date: Sep. 14, 2021

(87) PCT Pub. No.: WO2021/143350
PCT Pub. Date: Jul. 22, 2021

(65) Prior Publication Data
US 2022/0345781 A1    Oct. 27, 2022

(30) Foreign Application Priority Data

Jan. 16, 2020   (CN) .......................... 202010047295.3

(51) Int. Cl.
*H04N 7/16*     (2011.01)
*H04N 21/4784*  (2011.01)
(Continued)

(52) U.S. Cl.
CPC ..... *H04N 21/4784* (2013.01); *H04N 21/2187* (2013.01); *H04N 21/4788* (2013.01)

(58) Field of Classification Search
CPC .......... H04N 21/4784; H04N 21/2187; H04N 21/4788
(Continued)

(56) References Cited

U.S. PATENT DOCUMENTS 8,413,206 B1 * 4/2013 Wyatt .............. H04N 21/25866
725/23
2009/0144633 A1   6/2009 Schultz et al.
(Continued)

FOREIGN PATENT DOCUMENTS

CN    101097622 A    1/2008
CN    105791093 A    7/2016
(Continued)

OTHER PUBLICATIONS

International Search Report dated Feb. 7, 2021, from application No. PCT/CN2020/130224, 5 Pages.
(Continued)

*Primary Examiner* — Jeffrey F Harold
*Assistant Examiner* — Sahar Aqil Riaz
(74) *Attorney, Agent, or Firm* — Foley & Lardner LLP

(57) ABSTRACT

The present disclosure provides a method for data processing, a server, and a live broadcast system. The method includes: in response to a gift giving instruction sent by a first electronic device through a first user account on a first live broadcast platform, the gift giving instruction including a gift identifier of a virtual gift, and a platform identifier and a host identifier of a second live broadcast platform, determining a second virtual currency value of the virtual gift on the second live broadcast platform according to the gift identifier, and converting the second virtual currency value to a first virtual currency value on the first live broadcast platform; and sending information corresponding to the virtual gift to a second electronic device in response to
(Continued)

deducting the first virtual currency value from the first user account.

19 Claims, 5 Drawing Sheets

(51) Int. Cl.
    *H04N 21/2187* (2011.01)
    *H04N 21/4788* (2011.01)

(58) Field of Classification Search
    USPC .......................................................... 725/23
    See application file for complete search history.

(56) References Cited

U.S. PATENT DOCUMENTS

| | | | | |
|---|---|---|---|---|
| 2012/0136793 | A1* | 5/2012 | Valin | G06Q 30/0277 705/52 |
| 2012/0290412 | A1* | 11/2012 | Marovets | G06Q 30/02 705/14.73 |
| 2015/0051949 | A1* | 2/2015 | Pickton | G06Q 30/0202 705/7.31 |
| 2016/0012465 | A1* | 1/2016 | Sharp | G06Q 20/321 705/14.17 |
| 2016/0350791 | A1* | 12/2016 | Schindler | G06Q 50/01 |
| 2019/0364305 | A1 | 11/2019 | Jagadish et al. | |

FOREIGN PATENT DOCUMENTS

| | | |
|---|---|---|
| CN | 106685971 A | 5/2017 |
| CN | 106686393 A | 5/2017 |
| CN | 106713967 A | 5/2017 |
| CN | 107087237 A | 8/2017 |
| CN | 107369046 A | 11/2017 |
| CN | 107426626 A | 12/2017 |
| CN | 108156507 A | 6/2018 |
| CN | 108876431 A | 11/2018 |
| CN | 109685487 A | 4/2019 |
| CN | 109698964 A | 4/2019 |
| CN | 110337025 A | 10/2019 |
| CN | 110392278 A | 10/2019 |
| CN | 110599263 A | 12/2019 |
| CN | 110675149 A | 1/2020 |
| CN | 111277908 A | 6/2020 |
| WO | WO-2009/079472 A1 | 6/2009 |
| WO | WO-2019/088721 A1 | 5/2019 |

OTHER PUBLICATIONS

Notification to Grant Patent Right for Invention dated Mar. 8, 2021, from application No. 202010047295.3, 8 Pages.

Extended European Search Report issued by the European Patent Office for corresponding European Patent Application No. 20913369.3, dated Oct. 26, 2022, 11 pages.

* cited by examiner

METHOD FOR DATA PROCESSING AND LIVE BROADCAST SYSTEM

CROSS-REFERENCE

The present application is a national stage entry under 35 U.S.C. § 371 of International Application No. PCT/CN2020/130224, filed on Nov. 19, 2020, which claims the priority to the Chinese Patent Application NO. 202010047295.3, entitled "DATA PROCESSING METHOD, DEVICE, SERVER, LIVE BROADCAST SYSTEM AND STORAGE MEDIUM," filed with China National Intellectual Property Administration on Jan. 16, 2020, the content of which is hereby incorporated by reference in its entirety.

TECHNICAL FIELD

The present disclosure relates to the field of Internet live broadcast technologies, and in particular to methods, non-transitory processor-readable media, and devices for data processing in live broadcasts.

BACKGROUND

With the development of Internet technologies, online live broadcasts allow users to casually interact. There are increasingly more live broadcast platforms, and users may choose any one of the live broadcast platforms according to their needs and watch live broadcasts by entering live broadcast rooms of hosts on the live broadcast platforms and interacting with the hosts by giving virtual gifts.

At present, each host platform has its own account system and virtual currency exchange system. In a case where a user of a live broadcast platform B wants to enter a live broadcast platform A to watch the live broadcast on the live broadcast platform A and interact with the host in the live broadcast platform A, due to different account systems and virtual currency exchange systems, the user needs to re-register an account on the live broadcast platform A and purchase and give gifts based on the virtual currency exchange system of the live broadcast platform A, which involves cumbersome operations. In addition, a new virtual currency exchange system also increases user's understanding cost and reduces user's enthusiasm for participating in the interaction.

SUMMARY

Arrangements of the present disclosure provide data processing methods and devices, servers, live broadcast systems, and storage media.

In some arrangements, a data processing method, applied to a first server, includes receiving a gift giving instruction sent by a first electronic device through a first user account on a first live broadcast platform, wherein the gift giving instruction includes a gift identifier of a virtual gift, and a platform identifier and a host identifier of a second live broadcast platform; determining a second virtual currency value of the virtual gift on the second live broadcast platform indicated by the platform identifier according to the gift identifier, and converting the second virtual currency value to a first virtual currency value on the first live broadcast platform, and sending information corresponding to the virtual gift to a second electronic device where a second user account indicated by the host identifier on the second live broadcast platform is located in response to deducting the first virtual currency value from the first user account.

In some arrangements, a data processing device, applied to a first server, includes a gift giving instruction receiving unit, configured to receive a gift giving instruction sent by a first electronic device through a first user account on a first live broadcast platform, wherein the gift giving instruction includes a gift identifier of a virtual gift, and a platform identifier and a host identifier of a second live broadcast platform; a gift value determining unit, configured to determine a second virtual currency value of the virtual gift on the second live broadcast platform pointed to by the platform identifier according to the gift identifier, and convert the second virtual currency value to a first virtual currency value on the first live broadcast platform; and a gift giving unit, configured to send information corresponding to the virtual gift to a second electronic device where a second user account pointed to by the host identifier on the second live broadcast platform is located in response to deducting the first virtual currency value from the first user account.

In some arrangements, a server includes a processor; a memory for storing instructions executable by the processor; wherein, the processor, when executing the executable instructions, is configured to perform any one of the methods in the first aspect.

In some arrangements, a live broadcast system includes a first server, a first electronic device, and a second electronic device; the first electronic device is configured to send a gift giving instruction to the first server through a first user account on a first live broadcast platform, wherein the gift giving instruction includes a gift identifier of a virtual gift, and a platform identifier and a host identifier of a second live broadcast platform; the first server is configured to: receive the gift giving instruction; determine a second virtual currency value of the virtual gift on the second live broadcast platform indicated by the platform identifier according to the gift identifier, and convert the second virtual currency value to a first virtual currency value on the first live broadcast platform; and send information corresponding to the virtual gift to the second electronic device where a second user account indicated by the host identifier on the second live broadcast platform is located in response to deducting the first virtual currency value from the first user account; and the second electronic device is configured to receive the information corresponding to the virtual gift and display the virtual gift.

In some arrangements, a computer-readable storage medium storing computer-readable instructions therein, such that when executed by a processor of a server, causes the server to perform a method including receiving a gift giving instruction sent by a first electronic device through a first user account on a first live broadcast platform, wherein the gift giving instruction includes a gift identifier of a virtual gift, and a platform identifier and a host identifier of a second live broadcast platform; determining a second virtual currency value of the virtual gift on the second live broadcast platform indicated by the platform identifier according to the gift identifier, and converting the second virtual currency value to a first virtual currency value on the first live broadcast platform, and sending information corresponding to the virtual gift to a second electronic device where a second user account indicated by the host identifier on the second live broadcast platform is located in response to deducting the first virtual currency value from the first user account.

In some arrangements, a computer program product, including executable program codes for receiving a gift giving instruction sent by a first electronic device through a first user account on a first live broadcast platform, wherein the gift giving instruction includes a gift identifier of a virtual gift, and a platform identifier and a host identifier of a second live broadcast platform; determining a second virtual currency value of the virtual gift on the second live broadcast platform indicated by the platform identifier according to the gift identifier, and converting the second virtual currency value to a first virtual currency value on the first live broadcast platform, and sending information corresponding to the virtual gift to a second electronic device where a second user account indicated by the host identifier on the second live broadcast platform is located in response to deducting the first virtual currency value from the first user account.

It should be noted that the above general description and the following detailed description are merely example and explanatory and should not be construed as limiting the disclosure.

DETAILED DESCRIPTION

Figures 1, 2:
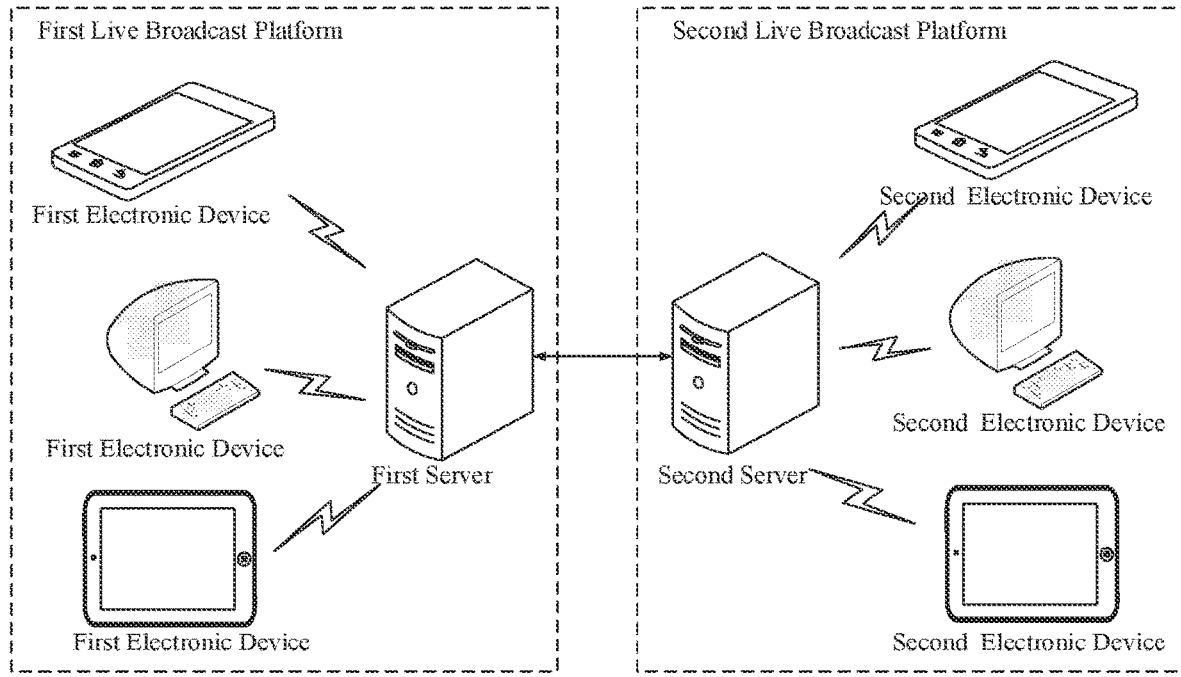
FIG. 1 is a schematic diagram illustrating a live broadcast application scenario according to an arrangement of the present disclosure.
FIG. 2 is a flowchart illustrating a method for data processing according to some arrangements of the present disclosure.

Example arrangements will be described in detail here, examples of which are illustrated in the accompanying drawings. When the following description refers to the accompanying drawings, same reference numerals in different drawings represent the same or similar elements unless otherwise indicated. The implementations described in the following example arrangements do not represent all implementations consistent with the arrangements of the present application. Rather, they are merely examples of devices and methods consistent with some aspects of the arrangements of the present application as detailed in the appended claims.

The terms used in the present disclosure are merely for the purpose of describing particular arrangements and are not intended to limit the present disclosure. As used in the present disclosure and the appended claims, the singular forms "a", "the" and "said" are intended to include the plural forms as well, unless the context clearly indicates otherwise. It should also be understood that the term "and/or" as used herein refers to and includes any or all possible combinations of one or more of the associated listed items.

It should be understood that, although the terms first, second, third, etc. may be used in the present disclosure to describe various information, such information should not be limited to these terms. These terms are only used to distinguish the same type of information from each other. For example, without departing from the scope of the present disclosure, the first information may also be referred to as the second information, and similarly, the second information may also be referred to as the first information. Depending on the context, the word "if" as used herein may be interpreted as "upon" or "when" or "in response to determining".

The arrangements of the present disclosure provide a data processing method, which may be applied to an application scenario shown in FIG. 1. FIG. 1 includes a first server 111 of a first live broadcast platform 121, a first server 112 of a second live broadcast platform 122, a first electronic device 131 and a second electronic device 132. Each of the first electronic device 131 and the second electronic device 132 may be a smart device such as a smart phone, a tablet computer, a personal computer, a personal digital assistant (PDA), a multimedia player, and a wearable device. In addition, the first server 111 and the first server 112 may also be large computing devices such as cloud servers.

In some arrangements, the first server 111 and the first server 112 mutually acquire an access address of each other and establish a connection, and then the first server 111 where the first live broadcast platform is located may provide a live broadcast service to the first electronic device 131, and also provide the live broadcast service to the second electronic device 132 through the first server 112. The first server 112 where the second live broadcast platform 122 is located may also provide the live broadcast service to the second electronic device 132, and provide the live broadcast service to the first electronic device 131 through the first server 111.

Through the interaction between these two servers, the user may install a live broadcast client of the first live broadcast platform by using the first electronic device 131, and log in to the first server 111 where the first live broadcast platform is located through a registered first user account on the live broadcast client, so as to acquire the live broadcast services provided by the first server 111 and the first server 112; the user may also install a browser client by using the first electronic device 131, and log in to the first server 111 where the first live broadcast platform is located through the registered first user account on the browser client, so as to acquire the live broadcast services provided by the first and second servers 111 and 112, that is, the user does not need to re-register a new account, and can watch live broadcast contents of two live broadcast platforms with one account through the interaction of these two servers at backend, which is further convenient for the user.

Through the interaction between these two servers, the user may install a live broadcast client of the second live broadcast platform 122 by using the second electronic device 132, and log in to the first server 112 where the second live broadcast platform 122 is located through a registered second user account on the live broadcast client, so as to acquire the live broadcast services provided by the first server 111 and the first server 112; the user may also install the browser client by using the second electronic device 132, and log in to the first server 112 where the second live broadcast platform 122 is located through the registered second user account on the browser client, so as to acquire the live broadcast services provided by the first and second servers 111 and 112, that is, the user does not need to re-register a new account, and can watch live broadcast contents of two live broadcast platforms with one account through the interaction of these two servers at backend, which is further convenient for the user.

In some arrangements, two types of users are involved in a live broadcast process, one type of users is a host user, and the other type of users is an audience user. The live broadcast client provides a host live broadcast function and a live broadcast watching function. The host user may use the live broadcast function provided by the live client to conduct a live broadcast, and the audience user may use the watching function provided by the client to watch live broadcast contents of the host user. The audience user of the first live broadcast platform can watch the live broadcast content of a host of the first live broadcast platform, and can also watch the live broadcast content of a host of the second live broadcast platform 122. Similarly, the audience user of the second live broadcast platform 122 can watch the live broadcast content of the host of the second live broadcast platform 122, and can also watch the live broadcast content of the host of the first live broadcast platform.

In two scenarios where the audience user of the first live broadcast platform watches the live broadcast content of the host of the second live broadcast platform, or the audience user of the second live broadcast platform watches the live broadcast content of the host of the first live broadcast platform, in a case where the audience user wants to interact with the host by giving a gift, the data processing method provided in the arrangements of the present disclosure may be adopted. The description will be given below in an example where the audience user of the first live broadcast platform watches the live broadcast content of the host of the second live broadcast platform.

FIG. 2 is a flowchart of a method for data processing according to an example arrangement of the present disclosure. The method is applied to a first server, and the first server is a server where the first live broadcast platform is located. The method includes:

in S101, receiving a gift giving instruction sent by a first electronic device through a first user account on a first live broadcast platform, where the gift giving instruction includes a gift identifier of a virtual gift, and a platform identifier and a host identifier of a second live broadcast platform;

in S102, determining a second virtual currency value of the virtual gift on the second live broadcast platform indicated by the platform identifier according to the gift identifier, and converting the second virtual currency value to a first virtual currency value on the first live broadcast platform; and in S103, sending information corresponding to the virtual gift to a second electronic device where a second user account indicated by the host identifier on the second live broadcast platform is located in response to deducting the first virtual currency value from the first user account.

In some arrangements, the first server acquires the access address of the second server, and then accesses the second server through the access address, thus establishing a connection with the second server, where the second server is a server where the second live broadcast platform is located, so that the first server can acquire host identifiers of one or more hosts on the second live broadcast platform. The host identifier is used for uniquely identifying the host, and the first server may acquire live broadcast data of one or more hosts during the live broadcast process from the second server based on the host identifiers. The first server may provide an access manner for accessing live broadcast rooms corresponding to the one or more host identifiers to the first electronic device (such as providing a link to access the live broadcast room corresponding to the host identifier, etc.). The audience user may access the live broadcast room corresponding to the host identifier according to actual needs through the access manner provided by the first server, in order to watch the live broadcast content of the host. The first server may send live broadcast data of the live broadcast room selected by the audience user to the first electronic device where the audience user is located, so as to display the live broadcast content indicated by the live broadcast data on the first electronic device. It should be understood that in the arrangements of the present disclosure, there is no limitation on the acquiring manner of the access address and the host identifier, which may be specifically set according to an actual situation. For example, the access address and the host identifier may be entered by the user.

In some arrangements, the first server may acquire information of several virtual gifts of the second live broadcast platform from the second server. The information of the virtual gifts includes display data, corresponding gift identifiers and corresponding second virtual currency values of the virtual gifts. In a case where the audience user wants to interact with the host by giving the gift while watching the live broadcast of the host on the second live broadcast platform, the audience user may send a gift acquisition instruction to the first server through the first electronic device, and the gift acquisition instruction is used for acquiring the display data and the corresponding gift identifiers of the several virtual gifts of the second live broadcast platform. The first server may send the display data and the corresponding gift identifiers of the several virtual gifts to the first electronic device in response to the gift acquisition instruction sent by the first electronic device. In the case where the audience user wants to interact with the host by giving the gift, the virtual gifts are displayed on a gift selection page displayed by the first electronic device according to the display data, so that the audience user may make a selection based on the displayed virtual gifts.

In the S101, in the case where the user wants to interact with the host by giving the gift while watching the live broadcast, the user selects the corresponding virtual gift on the first electronic device, and the first electronic device may send a gift giving instruction to the first server through a first user account on the first live broadcast platform. The gift giving instruction includes the gift identifier of the virtual gift, and the platform identifier and the host identifier of the second live broadcast platform, so that the first server may perform subsequent giving in response to receiving the gift giving instruction. In some arrangements, the audience user of the first live broadcast platform does not need to re-register a new account on the second live broadcast platform, and can directly give the gift to the host on the second live broadcast platform based on the first user account registered on the first live broadcast platform, thus reducing user operation steps and improving user experience.

In the S102, since the first server has acquired, from the second server in advance, the information of the several virtual gifts which includes the display data, the corresponding gift identifiers and the corresponding second virtual currency values of the virtual gifts, the first server may, in response to receiving the gift giving instruction, determine the second virtual currency value of the virtual gift on the second live broadcast platform indicated by the platform identifier according to the gift identifier, and then convert the second virtual currency value to the first virtual currency value on the first live broadcast platform. In some arrangements, in a case where the audience user of the first live broadcast platform wants to give the gift to the host of the second live broadcast platform, there is no need to understand virtual currency exchange rules of the second live broadcast platform, the first server performs the conversion between the first virtual currency and the second virtual currency, so that audience user of the first live broadcast platform can use the first virtual currency to purchase and give the virtual gift.

In some arrangements, the first server may determine the first virtual currency value according to the second virtual currency value and a pre-stored currency conversion relationship, and the currency conversion relationship represents a conversion relationship between the first virtual currency and the second virtual currency. In the arrangements, the conversion between the first virtual currency and the second virtual currency can be quickly performed based on the currency conversion method, which is beneficial to improve a response speed of the first server.

In the S103, in response to determining the first virtual currency value corresponding to the virtual gift, the first server deducts the first virtual currency value from the first user account, and then sends the information corresponding to the virtual gift to the second electronic device where the second user account indicated by the host identifier on the second live broadcast platform is located, so that the second electronic device can display the virtual gift according to the information. In the arrangements, it achieves a process in which the audience user of the first live broadcast platform gives the gift to the host of the second live broadcast platform, that is, achieves a cross-platform live broadcast interaction process.

In some arrangements, the first server sends the information corresponding to the virtual gift to the second server of the second live broadcast platform, and the information may include the gift identifier of the virtual gift and the host identifier. In response to receiving the information, the second server sends the information to the second electronic device where the second user account indicated by the host identifier is located, so that the second electronic device may displays the virtual gift based on the gift identifier of the virtual gift, thus realizing the cross-platform live broadcast interaction process. Further, through the conversion process of the first server and the interaction between the two servers, the audience user of the first live broadcast platform can watch the live broadcast content of other live broadcast platforms without registering a new account and understanding new virtual currency exchange rules, which reduces the user operation steps and facilitates the use by the user.

In some arrangements, in response to receiving the gift giving instruction that includes the gift identifier of the virtual gift, and the platform identifier and the host identifier of the second live broadcast platform, which is sent by the first electronic device through the first user account on the first live broadcast platform, the first server determines the second virtual currency value of the virtual gift on the second live broadcast platform indicated by the platform identifier according to the gift identifier, converts the second virtual currency value to the first virtual currency value on the first live broadcast platform, deducts the first virtual currency value from the first user account, and sends the information corresponding to the virtual gift to the second electronic device where the second user account indicated by the host identifier on the second live broadcast platform is located, so that the second electronic device can display the virtual gift according to the information. In some arrangements, based on the currency conversion process performed by the first server and the interaction between the two servers, the audience user of the first live broadcast platform can directly give the gift to the host of the second live broadcast platform based on the first user account registered on the first live broadcast platform, thus reducing the user operation steps and improving user experience. In addition, the first server performs the conversion between the first virtual currency and the second virtual currency, and the audience user of the first live broadcast platform can directly use the first virtual currency to purchase and give the virtual gift without understanding the virtual currency exchange rules of the second live broadcast platform, which further facilitates the use by the users and helps increase the enthusiasm of the user to participate in interaction. In addition, the conversion process also eliminates a need for development work of developers with respect to the compatibility of different virtual currency exchange systems of the two live broadcast platforms, thus facilitating to shorten a development cycle. Further, the first server sends the information corresponding to the virtual gift to the second electronic device where the second user account indicated by the host identifier on the second live broadcast platform is located, so that the second electronic device can display the virtual gift according to the information, which realizes the cross-platform live broadcast interaction process.

Figure 3:
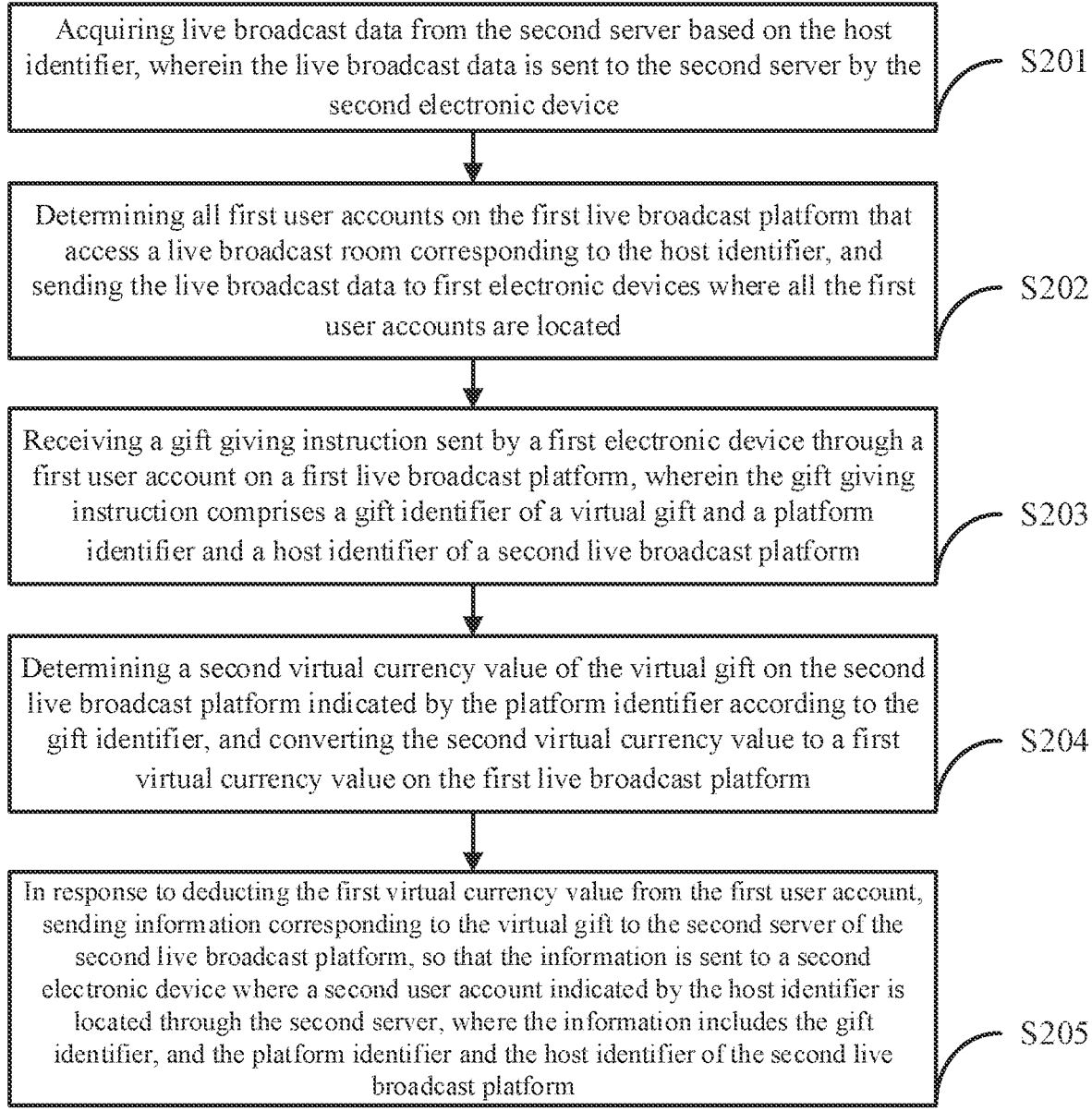
FIG. 3 is a flowchart illustrating a method for data processing according to some arrangements of the present disclosure.

FIG. 3 is a flowchart of a method for data processing according to an arrangement of the present disclosure, and the method includes:

in S201, acquiring live broadcast data from a second server based on a host identifier, where the live broadcast data is sent to the second server by a second electronic device;

in S202, determining all first user accounts on a first live broadcast platform that access a live broadcast room corresponding to the host identifier, and sending the live broadcast data to first electronic devices where all the first user accounts are located;

in S203, receiving a gift giving instruction sent by the first electronic device through the first user account on the first live broadcast platform, where the gift giving instruction includes a gift identifier of a virtual gift, a platform identifier and a host identifier of a second live broadcast platform;

in S204, determining a second virtual currency value of the virtual gift on the second live broadcast platform indicated by the platform identifier according to the gift identifier, and converting the second virtual currency value to a first virtual currency value on the first live broadcast platform; and in S205, in response to deducting the first virtual currency value from the first user account, sending information corresponding to the virtual gift to the second server of the second live broadcast platform, so that the information is sent to a second electronic device where a second user account indicated by the host identifier is located through the second server, where the information includes the gift identifier, and the platform identifier and the host identifier of the second live broadcast platform.

In the S201, the first server acquires the access address of the second server, and then accesses the second server through the access address, thus establishing a connection with the second server, so that the first server may send a live broadcast data acquisition request to the second server based on the acquired host identifier. During the live broadcast by the host of the second live broadcast platform through the second electronic device, the second electronic device sends the acquired live broadcast data to the second server, and then the second server sends the live broadcast data to the first server according to the live broadcast data acquisition request In the S202, in response to acquiring the live broadcast data, the first server determines all the first user accounts on the first live broadcast platform that access a live broadcast room corresponding to the host identifier, that is, the first server determines all the first user accounts on the first live broadcast platform that watch the live broadcast by the host corresponding to the host identifier on the second live broadcast platform, and sends the live broadcast data to the first electronic devices where all the first user accounts are located, so that the first electronic devices display the live broadcast content indicated by the live broadcast data, and the audience user of the first live broadcast platform can watch the live broadcast content of the host on the second live broadcast platform. In some arrangements, during the live broadcast by the host on the second live broadcast platform through the second electronic device, the audience user of the first live broadcast platform can choose whether to watch the live broadcast contents of the host on the second live broadcast platform or not according to their own needs. In a case where the audience user wants to watch the live broadcast content, the audience user can perform a corresponding live broadcast room access operation on the first electronic device. It should be understood that in the arrangements, there is no limitation on the live broadcast room access operation, and specific settings may be made according to an actual condition. For example, the live broadcast room access operation may be a click, slide, or long press operation, etc. The first electronic device may send a live broadcast room access instruction to the first server through the first user account on the first live broadcast platform according to the live broadcast room access operation, and the live broadcast room access instruction includes the platform identifier and the host identifier of the second live broadcast platform, and account information of the first user account. The first server receives the live broadcast room access instruction sent by the first electronic device through the first user account on the first live broadcast platform, records the account information of the first user account and the corresponding first electronic device, and then the first server may send the live broadcast data to the first electronic device where the first user account is located in response to acquiring the live broadcast data, so that the first electronic device displays the live broadcast content indicated by the live broadcast data, and the audience user of the first live broadcast platform can watch the live broadcast content of the host on the second live broadcast platform, realizing the cross-platform live broadcast process.

In some arrangements, the first server may also send the host identifier and the account information to the second server indicated by the platform identifier, and the host identifier and the account information are used for triggering the second server to send the account information to the second electronic device where the second user account indicated by the host identifier is located, so that the account information is displayed by the second electronic device. That is, in response to receiving the host identifier and the account information, the second server sends the account information to the second electronic device where the second user account indicated by the host identifier is located, and the second electronic device may display the account information to prompt the host that the audience on the first live broadcast platform accesses the live broadcast room. In the arrangements, the account information is sent to the second electronic device where the host is located through the interaction between the two servers, so as to prompt the host that the audience of the first live broadcast platform accesses the live broadcast room, thus realizing the interaction between the host and the audience on the first live broadcast platform, and realizing the cross-platform live broadcast process.

According to the above arrangements, through the interaction between the first server and the second server, the audience user of the first live broadcast platform can watch the live broadcast content of the host on the second live broadcast platform, realizing the cross-platform live broadcast process. In addition, this process is implemented by the two servers in a backend way, the audience user will not perceive the difference between these two live broadcast platforms at a use level, and the user does not need to adapt to the new live broadcast platform, that is, the user can watch the live broadcast content of other live broadcast platforms on one live broadcast platform, which is further convenient for the user to use, and there is no need to download another live broadcast platform client, which is beneficial to saving memory resources of the first electronic device.

Figure 4:
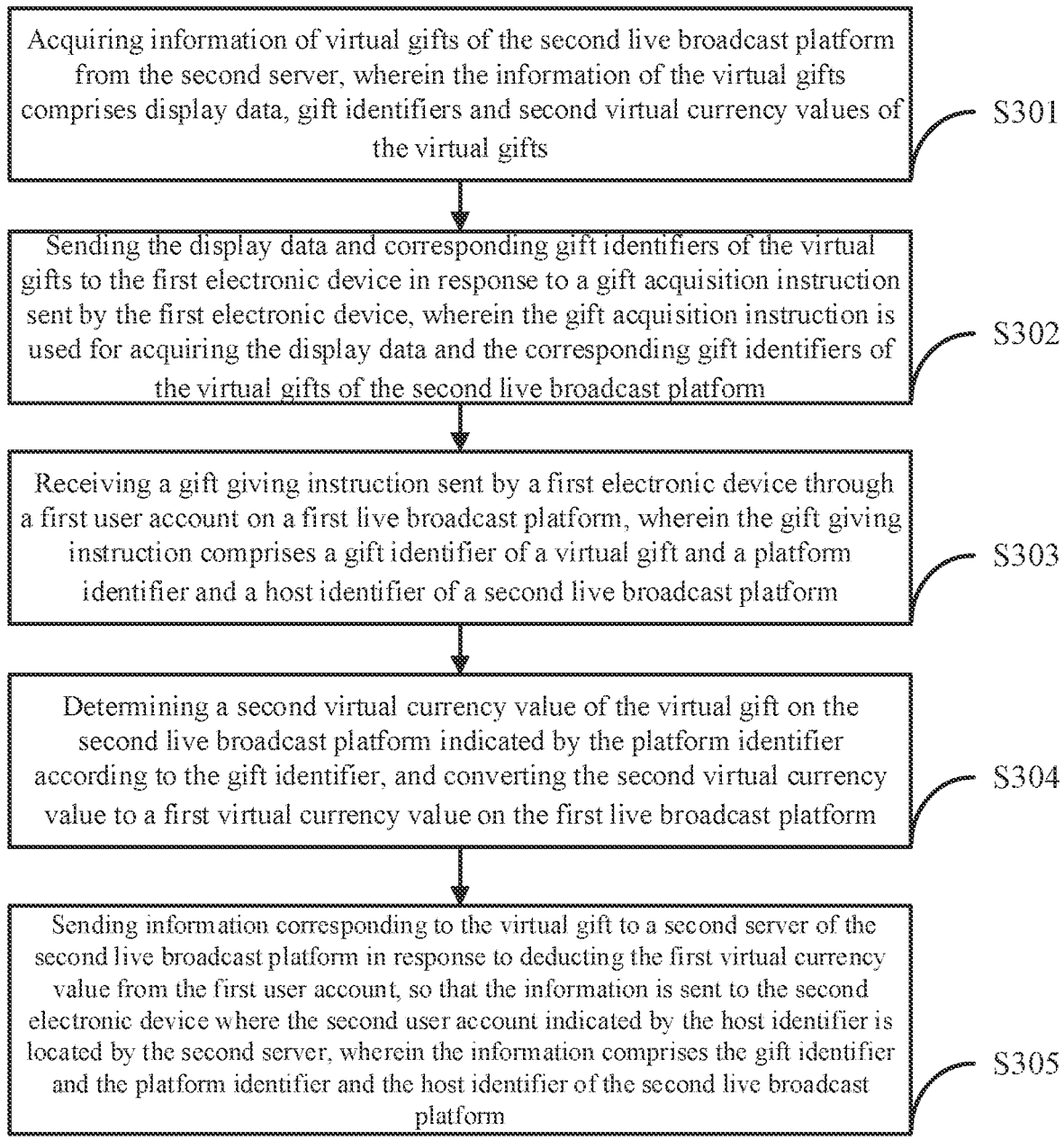
FIG. 4 is a flowchart illustrating a method for data processing according to some arrangements of the present disclosure.

FIG. 4 is a flowchart of a method for data processing according to an example arrangement of the present disclosure, and the method includes:

in S301, acquiring information of several virtual gifts of the second live broadcast platform from the second server, where the information of the virtual gifts includes display data, gift identifiers and second virtual currency values of the virtual gifts;

in S302, in response to a gift acquisition instruction sent by the first electronic device, sending the display data and the corresponding gift identifiers of the virtual gifts to the first electronic device, where the gift acquisition instruction is used for acquiring the display data and the corresponding gift identifiers of the several virtual gifts on the second live broadcast platform;

in S303, receiving the gift giving instruction sent by the first electronic device through the first user account on the first live broadcast platform, where the gift giving instruction includes the gift identifier of the virtual gift and the platform identifier and the host identifier of the second live broadcast platform;

in S304, determining the second virtual currency value of the virtual gift on the second live broadcast platform indicated by the platform identifier according to the gift identifier, and converting the second virtual currency value to the first virtual currency value on the first live broadcast platform; and in S305, in response to deducting the first virtual currency value from the first user account, sending the information corresponding to the virtual gift to the second server of the second live broadcast platform, so that the information is sent to the second electronic device where the second user account indicated by the host identifier is located through the second server; where the information includes the gift identifier, the platform identifier and the host identifier of the second live broadcast platform.

In some arrangements, the first server establishes the connection with the second server, and the first server may acquire the information of the virtual gifts of the second live broadcast platform from the second server, where the information of the virtual gifts includes the display data, the corresponding gift identifiers and the corresponding second virtual currency values of the virtual gifts, and then the first server can store the information of the virtual gifts, so that the audience user of the first live broadcast platform can send the gift acquisition instruction to the first server through the first electronic device in a case where the audience user of the first live broadcast platform wants to interact with the host by giving the gift while watching the live broadcast content of the host on the second live broadcast platform. In response to the gift acquisition instruction sent by the first electronic device, the first server sends the display data and the corresponding gift identifiers of the virtual gifts to the first electronic device, and in response to receiving the display data and the corresponding gift identifiers of the several virtual gifts, the first electronic device can display the virtual gifts on the gift selection page displayed thereon according to the display data. The audience user of the first live broadcast platform can select a gift to be given on the gift selection page, and send the gift giving instruction to the first server through the first electronic device after the selection. And then the first server performs the subsequent giving. In the arrangements, by acquiring the virtual gift information from the second server, the virtual gifts may be displayed on the gift selection page of the first electronic device as the audience user of the first live broadcast platform desires, so that the audience user of the first live broadcast platform can give the gift to the host of the second live broadcast platform, realizing a live broadcast interaction process. There is no need for the audience user of the first live broadcast platform to register a new account or understand the new virtual currency exchange system, which reduces the user operation steps and facilitates to increase the audience's enthusiasm for participating in interaction.

The virtual gifts may be displayed in a design image for the second live broadcast platform indicated by the display data on the gift selection page displayed on the first electronic device. Alternatively, in order to conform to an overall display style of the first live broadcast platform, the first server may also replace the display data of the virtual gifts, and send the replaced display data of the virtual gifts and the corresponding gift identifiers (the gift identifiers will not change) to the first electronic device, so that the virtual gifts may be displayed in a design image for the first live broadcast platform on the gift selection page displayed on the first electronic device, thus meeting individual needs and optimizing the user experience.

In some arrangements, the first server may also determine the first virtual currency value of the virtual gift according to the second virtual currency value of the virtual gift and the pre-stored currency conversion relationship which represents the conversion relationship between the first virtual currency and the second virtual currency, and in response to the gift acquisition instruction sent by the first electronic device, send the display data, the corresponding gift identifiers, and the corresponding first virtual currency values of the virtual gifts to the first electronic device, so that the first electronic device displays the virtual gifts on the displayed gift selection page according to the display data and display the corresponding first virtual currency values at the same time in response to receiving the display data, the corresponding gift identifiers, and the corresponding first virtual currency values of several virtual gifts, and the audience user of the first live broadcast platform may be aware of the virtual value of the virtual gift to be given, which is further convenient for the user to use.

Figure 5:
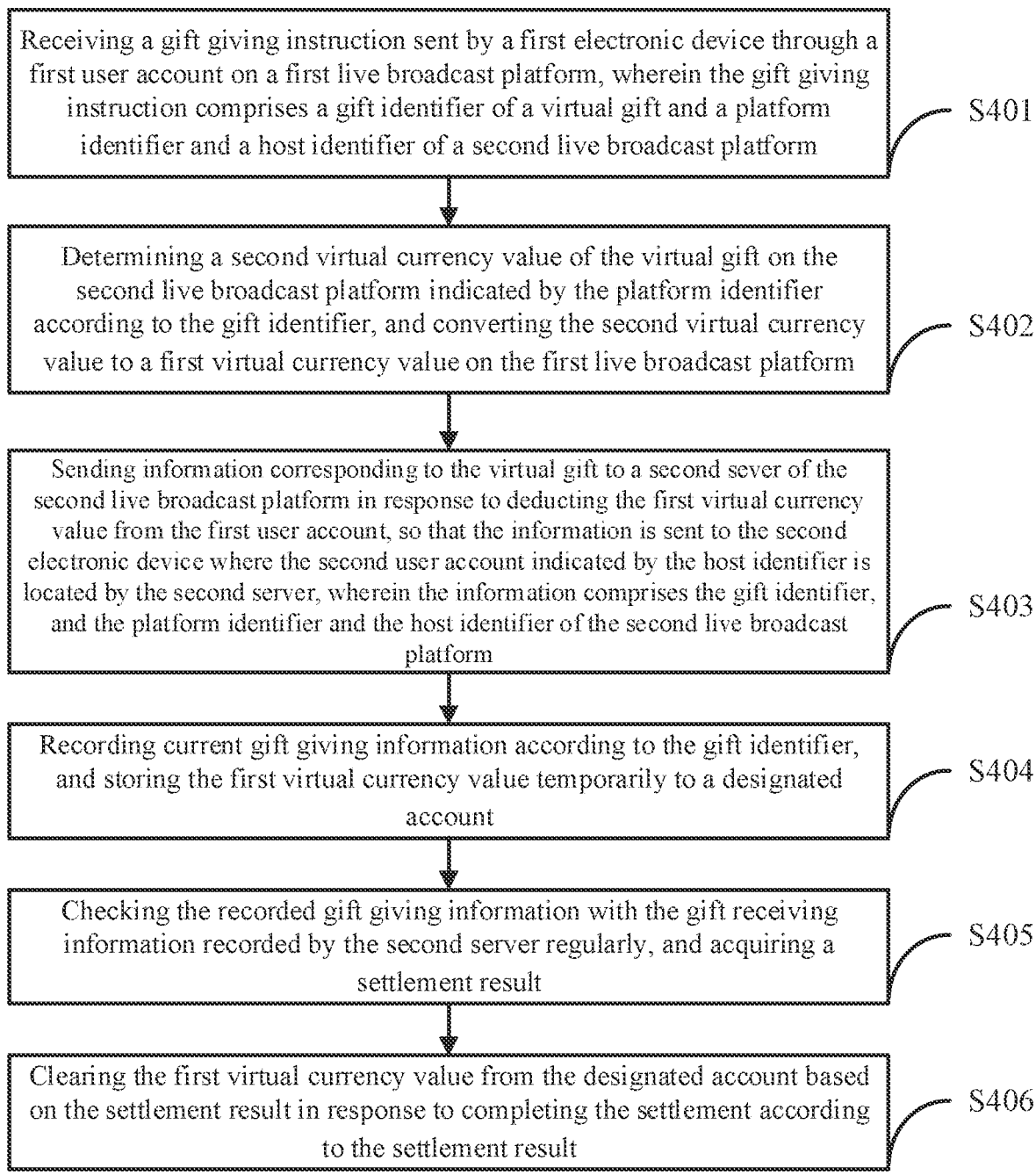
FIG. 5 is a flowchart illustrating a method for data processing according to some arrangement of the present disclosure.

FIG. 5 is a flowchart of a method for data processing according to an example arrangement of the present disclosure, and the method includes:

in S401, receiving a gift giving instruction sent by a first electronic device through a first user account on a first live broadcast platform, where the gift giving instruction includes a gift identifier of a virtual gift, a platform identifier and a host identifier of a second live broadcast platform;

in S402, determining a second virtual currency value of the virtual gift on the second live broadcast platform indicated by the platform identifier according to the gift identifier, and converting the second virtual currency value to a first virtual currency value on the first live broadcast platform;

in S403, in response to deducting the first virtual currency value from the first user account, sending information corresponding to the virtual gift to a second server of the second live broadcast platform, so that the information is sent to a second electronic device where a second user account indicated by the host identifier is located through the first user account, where the information includes the gift identifier, the platform identifier of the second live broadcast platform and the host identifier;

in S404, recording current gift giving information according to the gift identifier, and temporarily storing the first virtual currency value in a designated account;

in S405, periodically checking the recorded gift giving information with gift receiving information recorded by the second server to acquire a settlement result; and in S406, in response to completing settlement according to the settlement result, clearing the corresponding first virtual currency value from the designated account based on the settlement result.

In the arrangements, the first server may record the current gift giving information according to the gift identifier and temporarily store the first virtual currency value in the designated account in response to completing the current gift giving process (that is, after the first server sends the information corresponding to the virtual gift to the second electronic device through the second server). The information corresponding to the virtual gift is also used for triggering the second server to record the current gift receiving information according to the gift identifier and depositing the second virtual currency value corresponding to the virtual gift in the second user account after sending the information corresponding to the virtual gift to the second electronic device. In the arrangements, the two servers both record the information of the corresponding virtual gift in real time to facilitate a subsequent account reconciliation process between the two live broadcast platforms so as to ensure accuracy of the reconciliation result; and the second virtual currency value corresponding to the virtual gift is deposited in the second user account to ensure accuracy of the virtual property in the second user account.

According to an actual agreement, the first server may regularly check the gift giving information recorded in a period with the gift giving information recorded by the second server, and acquire the settlement result. The first live broadcast platform and the second live broadcast platform may perform account settlement according to the settlement result. There is no limitation on a specific account settlement method in the arrangements of the present application, and specific settings may be made according to the actual condition. The first server may clear the corresponding first virtual currency value from the designated account based on the settlement result in response to completing the settlement according to the settlement result. In the arrangements, it realizes a reconciling process between two live broadcast platforms based on the recorded information. Through the reconciliation and settlement process performed by the two servers at the backend, it is ensured that the audience user of the first live broadcast platform can purchase the gift of the second live broadcast platform through the virtual currency exchange system of the first live broadcast platform and give the gift to the host of the second live broadcast platform without registering a new account or understanding a new virtual currency exchange system, which reduces the user operation steps, further facilitates the user's use, and helps to increase the enthusiasm of the audience to participate in the interaction.

In another arrangement, in response to the completion of the current gift giving process, the first server may determine the current gift giving information based on the gift identifier, and the second server may also determine the current gift reception information based on the gift identifier after sending the information to the second electronic device, and deposits the second virtual currency value corresponding to the virtual gift into the second user account. And then the first server or the second server may obtain the settlement result by performing the checking based on the gift giving information and the gift receiving information, and perform financial settlement for this gift giving process. The first server may clear the corresponding first virtual currency value from the designated account based on the settlement result in response to completing the settlement according to the settlement result. In the arrangements, through the reconciliation and settlement process performed by the two servers at the backend, it is ensured that the audience user of the first live broadcast platform can purchase the gift of the second live broadcast platform through the virtual currency exchange system of the first live broadcast platform and give it to the host of the second live broadcast platform without registering a new account or understanding a new virtual currency exchange system, which reduces the user operation steps, further facilitates the user's use, and helps to increase the enthusiasm of the audience to participate in the interaction.

Corresponding to the arrangements of the methods for data processing of the present disclosure, the present disclosure also provides arrangements of a device for data processing, a serve, a live broadcast system, and a computer-readable storage medium.

Figure 6:
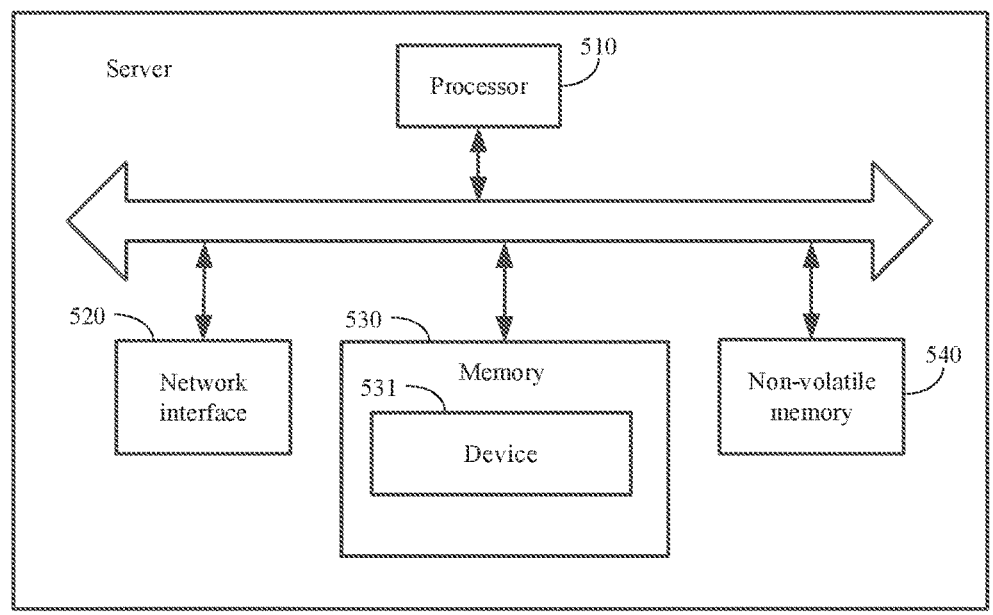
FIG. 6 is a structural block diagram illustrating a server according to an arrangement of the present disclosure.

The arrangements of the device for data processing in the present disclosure may be applied to a server. The device arrangements may be implemented by software, or may be implemented by hardware or a combination of software and hardware. Taking the software implementation as an example, as a device in a logical sense, it is formed by reading corresponding computer program instructions in a non-volatile memory into a memory by a processor that processes a file. In a hardware level, as shown in FIG. 6, it is a hardware structure diagram of an electronic device where the device for data processing is located in an arrangement of the present disclosure, in addition to a processor 510, a memory 530, a network interface 520, and a non-volatile memory 540, the server or electronic device in which the device 531 is located in the arrangements may also include other hardware generally according to the actual function of the computer device, which will not be repeated here.

Correspondingly, the arrangements of the present disclosure also provide a computer storage medium in which a program is stored, and the program, when executed by a processor, implements the method in any of the foregoing arrangements.

The present disclosure may take a form of a computer program product implemented on one or more storage media (including but not limited to a disk storage, a CD-ROM, an optical storage, etc.) containing program codes. The computer usable storage media include permanent and non-permanent, removable and non-removable media, and information storage may be achieved by any method or technology. The information may be computer-readable instructions, data structures, program modules, or other data. Examples of computer storage media include, but are not limited to: a phase change memory (PRAM), a static random access memory (SRAM), a dynamic random access memory (DRAM), other types of random access memory (RAM), a read-only memory (ROM), an electrically erasable programmable read-only memory (EEPROM), a flash memory or other memory technologies, a CD-ROM, a digital versatile disc (DVD) or other optical storage, a magnetic cassette, a magnetic tape storage or other magnetic storage devices or any other non-transmission media, which may be used to store information that may be accessed by the computing device.

Figure 7:
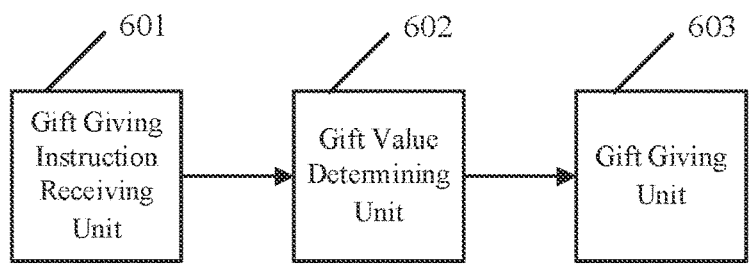
FIG. 7 is a block diagram illustrating an arrangement of a device for data processing according to an arrangement of the present disclosure.

FIG. 7 is a block diagram of a first arrangement of a device for data processing provided by an arrangement of the disclosure. The device is applied to a first server and includes:

a gift giving instruction receiving unit 601, configured to receive a gift giving instruction sent by a first electronic device through a first user account on a first live broadcast platform, where the gift giving instruction includes a gift identifier of a virtual gift, and a platform identifier and a host identifier of a second live broadcast platform;

a gift value determining unit 602, configured to determine a second virtual currency value of the virtual gift on the second live broadcast platform indicated by the platform identifier according to the gift identifier, and convert the second virtual currency value to a first virtual currency value on the first live broadcast platform; and a gift giving unit 603, configured to send information corresponding to the virtual gift to a second electronic device where a second user account indicated by the host identifier on the second live broadcast platform is located in response to deducting the first virtual currency value from the first user account.

In an arrangement, the gift value determining unit 602 includes:

a second virtual currency value determining module, configured to determine the second virtual currency value of the virtual gift on the second live broadcast platform according to the gift identifier; and a conversion module, configured to determine the first virtual currency value according to the second virtual currency value and a pre-stored currency conversion relationship, where the currency conversion relationship represents a conversion relationship between a first virtual currency and a second virtual currency.

In an arrangement, the gift giving unit 603 is configured to:

send the information corresponding to the virtual gift to a second server of the second live broadcast platform, so that the information is sent to the second electronic device where the second user account indicated by the host identifier is located by the second server; where the information includes the gift identifier, and the platform identifier and the host identifier of the second live broadcast platform.

In an arrangement, the device further includes:

a live broadcast data acquiring unit, configured to acquire live broadcast data from the second server based on the host identifier, where the live broadcast data is sent to the second server by the second electronic device; and a live broadcast data sending unit, configured to determine all first user accounts on the first live broadcast platform that access a live broadcast room corresponding to the host identifier, and send the live broadcast data to first electronic devices where all the first user accounts are located.

In an arrangement, the device further includes:

a virtual gift information acquiring unit, configured to acquire information of virtual gifts of the second live broadcast platform from the second server; where the information of the virtual gifts includes display data, gift identifiers and second virtual currency values of the virtual gifts; and a virtual gift information sending unit, configured to send the display data and the corresponding gift identifiers of the virtual gifts to the first electronic device in response to a gift acquisition instruction sent by the first electronic device; where the gift acquisition instruction is used for acquiring the display data and the corresponding gift identifiers of the virtual gifts of the second live broadcast platform.

In an arrangement, the virtual gifts are displayed on a gift selection page displayed by the first electronic device in a design image of the first live broadcast platform or a design image of the second live broadcast platform.

In an arrangement, the device further includes:

a live broadcast room access unit, configured to receive a live broadcast room access instruction sent by the first user account, where the live broadcast room access instruction includes the platform identifier and the host identifier of the second live broadcast platform, and account information of the first user account; and a user data sending unit, configured to send the host identifier and the account information to the second server indicated by the platform identifier; where the host identifier and the account information are used for triggering the second server to send the account information to the second electronic device where the second user account indicated by the host identifier is located, so that the account information is displayed by the second electronic device.

In an arrangement, the information corresponding to the virtual gift is further used for recording current gift receiving information according to the gift identifier.

In an arrangement, the device further includes:

a recording unit, configured to record current gift giving information according to the gift identifier, and store the first virtual currency value temporarily to a designated account;

a checking unit, configured to check the recorded gift giving information with the gift receiving information recorded by the second server regularly, and acquire a settlement result; and a settlement and clearing unit, configured to clear the first virtual currency value from the designated account based on the settlement result in response to completing the settlement according to the settlement result.

In an arrangement, the information corresponding to the virtual gift is also used for triggering the second server to deposit the second virtual currency value corresponding to the virtual gift into the second user account.

As for the device arrangements, since they generally correspond to the method arrangements, for the relevant part reference can be made to the description of the part of the method arrangements. The device arrangements described above are merely illustrative, the units described as separate components may or may not be physically separated, and the components displayed as units may or may not be physical units, that is, they may be located in one place, or may be distributed on multiple network units. Some or all of the modules can be selected according to actual needs to achieve the objectives of the solutions of the disclosure. Those of ordinary skill in the art can understand and implement it without creative work.

The arrangements of the present disclosure further provide a server, and the server includes: a processor; and a memory for storing instructions executable by the processor. The processor is configured to complete the method of any of the method arrangements in the present disclosure when executing the instructions.

The processor may be a central processing unit (CPU), or may be other general-purpose processors, a digital signal processor (DSP), an Application Specific Integrated Circuit (ASIC), a Field-Programmable Gate Array (FPGA) or other programmable logic devices, a discrete gate or transistor logic device, a discrete hardware component, etc. The general-purpose processor may be a microprocessor or the processor may also be any conventional processor or the like.

The memory may include at least one type of storage medium. The storage medium includes a flash memory, a hard disk, a multimedia card, a card-type memory (for example, SD or DX memory, etc.)), a random access memory (RAM), a static random access memory (SRAM), a read only memory (ROM), an electrically erasable programmable read only memory (EEPROM), a programmable read only memory (PROM), a magnetic memory, a magnetic disk, a CD, etc. Moreover, the device can cooperate with a network storage device that performs the storage function of the memory through a network connection. The memory may be an internal storage unit of the device, such as a hard disk or memory of the device. The memory may also be an external storage device of the device, such as a plug-in hard disk, a smart memory card (SMC), a Secure Digital (SD) card, a flash card equipped or the like provided on the device. Further, the memory may also include both an internal storage unit of the device and an external storage device. The memory is used to store the computer program and other programs and data required by the device. The memory can also be used to temporarily store data that has been output or will be output.

The various arrangements described herein can be implemented using a computer-readable medium such as computer software, hardware, or any combination thereof. For hardware implementation, the implementation described herein can be achieved by using at least one of an application-specific integrated circuit (ASIC), a digital signal processor (DSP), a digital signal processing device (DSPD), a programmable logic device (PLD), a field programmable gate array (FPGA), a processor, a controller, a microcontroller, a microprocessor, and an electronic unit designed to perform the functions described herein. For software implementation, implementations such as procedures or functions may be implemented with a separate software module that allows execution of at least one function or operation. The software codes can be implemented by software applications (or programs) written in any suitable programming language, and the software codes can be stored in a memory and executed by the controller.

For the implementation process of the functions and roles of each unit in the above-mentioned electronic device, reference can be made to the implementation process of the corresponding blocks in the above-mentioned methods for details, which will not be repeated here.

In example arrangements, there is also provided a storage medium including instructions, such as a memory including instructions, and the instructions may be executed by a processor of the server to complete any of the foregoing methods. Optionally, the storage medium may be a non-transitory computer-readable storage medium, for example, the non-transitory computer-readable storage medium may be a ROM, a random access memory (RAM), a CD-ROM, a magnetic tape, a floppy disk, and an optical data storage device, etc.

There is provided a non-transitory computer-readable storage medium. Instructions in the storage medium, when being executed by a processor of a terminal, cause the terminal to perform the above methods for data processing.

In example arrangements, there is also provided a computer program product, including executable program codes, and the program codes, when being executed by the foregoing device, implement any of the foregoing method arrangements.

In example arrangements, there is also provided a computer program product, including executable program codes, and the program codes, when being executed by the foregoing device, implement any of the foregoing method arrangements.

Figure 8:
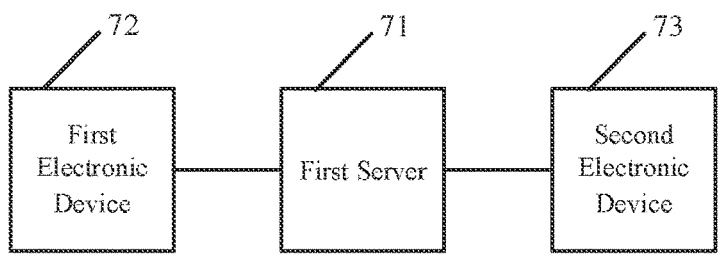
FIG. 8 is a structural diagram illustrating a live broadcast system according to some arrangements of the present disclosure.

FIG. 8 is a structural diagram of a live broadcast system according to an arrangement of the present disclosure, which includes a first server 71, a first electronic device 72, and a second electronic device 73.

The first electronic device 72 is configured to send a gift giving instruction to the first server 71 through a first user account on a first live broadcast platform, where the gift giving instruction includes a gift identifier of a virtual gift, and a platform identifier and a host identifier of a second live broadcast platform.

The first server 71 is configured to: receive the gift giving instruction; determine a second virtual currency value of the virtual gift on the second live broadcast platform indicated by the platform identifier according to the gift identifier, and convert the second virtual currency value to a first virtual currency value on the first live broadcast platform; and send information corresponding to the virtual gift to the second electronic device 73 where a second user account indicated by the host identifier on the second live broadcast platform is located in response to deducting the first virtual currency value from the first user account.

The second electronic device 73 is configured to receive the information corresponding to the virtual gift and display the virtual gift.

Figure 9:
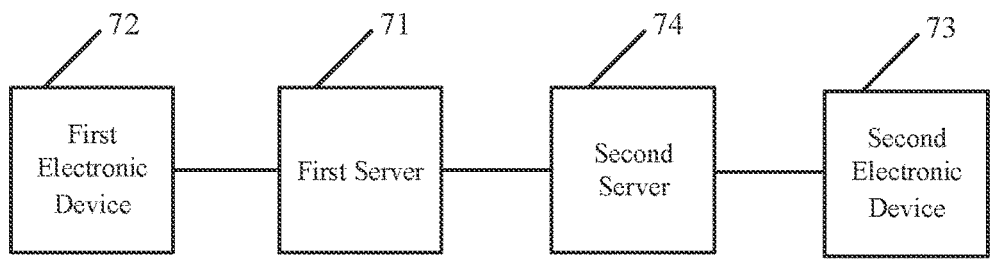
FIG. 9 is a structural diagram illustrating a live broadcast system according to some arrangements of the present disclosure.

FIG. 9 is a structural diagram of another live broadcast system according to an arrangement of the present disclosure. The live broadcast system further includes a second server 74.

The first server 71 is specifically configured to: send the information corresponding to the virtual gift to the second server 74 of the second live broadcast platform; where the information corresponding to the virtual gift includes the gift identifier, and the platform identifier and the host identifier of the second live broadcast platform.

The second server 74 is configured to send the information to the second electronic device 73 where the second user account indicated by the host identifier is located.

The second electronic device 73 is further configured to: display the virtual gift according to the gift identifier.

In an arrangement, the second electronic device 73 is further configured to acquire live broadcast data and send it to the second server 74.

The second server 74 is further configured to: receive the live broadcast data.

The first server 71 is further configured to: acquire the live broadcast data from the second server 74 based on the host identifier; determine all first user accounts on the first live broadcast platform that access a live broadcast room corresponding to the host identifier, and send the live broadcast data to first electronic devices 72 where all the first user accounts are located.

The first electronic device 72 is further configured to display the live broadcast content indicated by the live broadcast data.

In an arrangement, the first server 71 is further configured to: acquire information of several virtual gifts of the second live broadcast platform from the second server 74; where the information of the virtual gifts includes display data, corresponding gift identifiers and corresponding second virtual currency values of the virtual gifts.

The first electronic device 72 is further configured to send a gift acquisition instruction to the first server 71; where the gift acquisition instruction is used for acquiring the display data and the corresponding gift identifiers of the several virtual gifts of the second live broadcast platform.

The first server 71 is further configured to: send the display data and the corresponding gift identifiers of the virtual gifts to the first electronic device 72 in response to the gift acquisition instruction sent by the first electronic device 72.

The first electronic device 72 is further configured to display the virtual gifts on a displayed gift selection page according to the display data.

In an arrangement, the first electronic device 72 is further configured to: send a live broadcast room access instruction to the first server 71, where the live broadcast room access instruction includes the platform identifier and the host identifier of the second live broadcast platform, and account information of the first user account.

The first server 71 is further configured to: receive the live broadcast room access instruction, and send the host identifier and the account information to the second server 74 indicated by the platform identifier.

The second server 74 is further configured to send the account information to the second electronic device 73 where the second user account indicated by the host identifier is located The second electronic device 73 is further configured to: display the account information.

In an arrangement, the first server 71 is further configured to: record current gift giving information according to the gift identifier, and store the first virtual currency value temporarily to a designated account.

The second server 74 is further configured to record the gift receiving information according to the gift identifier.

The first server 71 is further configured to: check the recorded gift giving information with the gift receiving information recorded by the second server 74 regularly, and acquire a settlement result; and clear the first virtual currency value from the designated account based on the settlement result in response to completing the settlement according to the settlement result.

In an arrangement, the second server 74 is further configured to: deposit the second virtual currency value corresponding to the virtual gift into the second user account.

Those skilled in the art will easily think of other arrangements of the disclosure after considering the specification and practicing the arrangements disclosed herein. The disclosure is intended to cover any variations, uses, or adaptive changes of the disclosure which follow the general principles of the disclosure and include common knowledge or conventional technical means in the technical field not disclosed in the present disclosure. The description and the arrangements are to be regarded as illustrative only, and the true scope and spirit of the disclosure are pointed out by the appended claims.

It should be understood that the disclosure is not limited to the precise structures that have been described above and shown in the drawings, and various modifications and changes can be made without departing from the scope of the disclosure. The scope of the present disclosure is only defined by the appended claims.

What is claimed is:

1. A method for data processing, applied to a first server, the method comprising:
   receiving a gift giving instruction sent by a first electronic device through a first user account on a first live broadcast platform, wherein the gift giving instruction comprises a gift identifier of a virtual gift, and a platform identifier and a host identifier of a second live broadcast platform;
   determining a second virtual currency value of the virtual gift on the second live broadcast platform indicated by the platform identifier according to the gift identifier;
   converting the second virtual currency value to a first virtual currency value on the first live broadcast platform; and
   sending information corresponding to the virtual gift to a second electronic device where a second user account indicated by the host identifier on the second live broadcast platform is located in response to deducting the first virtual currency value from the first user account.

2. The method according to claim 1, wherein said converting the second virtual currency value to the first virtual currency value on the first live broadcast platform comprises:
   determining the first virtual currency value according to the second virtual currency value and a currency conversion relationship, wherein the currency conversion relationship represents a conversion relationship between a first virtual currency and a second virtual currency.

3. The method according to claim 1, wherein said sending the information corresponding to the virtual gift to the second electronic device where the second user account indicated by the host identifier on the second live broadcast platform is located comprises:
   sending the information corresponding to the virtual gift to a second server of the second live broadcast platform, wherein the information is sent to the second electronic device where the second user account indicated by the host identifier is located by the second server, and the information comprises the gift identifier, and the platform identifier and the host identifier of the second live broadcast platform.

4. The method according to claim 3, further comprising:
   acquiring live broadcast data from the second server based on the host identifier, wherein the live broadcast data is sent to the second server by the second electronic device; and
   determining all first user accounts on the first live broadcast platform that access a live broadcast room corresponding to the host identifier, and sending the live broadcast data to first electronic devices where all the first user accounts are located.

5. The method according to claim 3, wherein said receiving the gift giving instruction sent by the first electronic device through the first user account on the first live broadcast platform further comprises:
   acquiring information of virtual gifts of the second live broadcast platform from the second server, wherein the information of the virtual gifts comprises display data, gift identifiers, and second virtual currency values of the virtual gifts; and
   sending the display data and corresponding gift identifiers of the virtual gifts to the first electronic device in response to a gift acquisition instruction sent by the first electronic device, wherein the gift acquisition instruction is used for acquiring the display data and the corresponding gift identifiers of the virtual gifts of the second live broadcast platform.

6. The method according to claim 3, further comprising:
   receiving a live broadcast room access instruction sent by the first user account, wherein the live broadcast room access instruction comprises the platform identifier and the host identifier of the second live broadcast platform, and account information of the first user account; and
   sending the host identifier and the account information to the second server indicated by the platform identifier, wherein the host identifier and the account information are used for triggering the second server to send the account information to the second electronic device where the second user account indicated by the host identifier is located, so that the account information is displayed by the second electronic device.

7. The method according to claim 3, wherein the information corresponding to the virtual gift is further used for recording current gift receiving information according to the gift identifier, and the method comprises:
   recording current gift giving information according to the gift identifier, and storing the first virtual currency value temporarily to a designated account;
   checking the recorded gift giving information with the gift receiving information recorded by the second server regularly, and acquiring a settlement result; and
   clearing the first virtual currency value from the designated account based on the settlement result in response to completion of the settlement.

8. The method according to claim 3, wherein the information corresponding to the virtual gift is also used for triggering the second server to deposit the second virtual currency value corresponding to the virtual gift into the second user account.

9. The method according to claim 1, wherein the virtual gift is displayed on a gift selection page displayed by the first electronic device in a design image for the first live broadcast platform or a design image for the second live broadcast platform.

10. A server, comprising:
    a processor; and
    a memory for storing instructions executable by the processor;
    wherein the processor, when executing the executable instructions, is configured to perform a method comprising:
    receiving a gift giving instruction sent by a first electronic device through a first user account on a first live broadcast platform, wherein the gift giving instruction comprises a gift identifier of a virtual gift, and a platform identifier and a host identifier of a second live broadcast platform;
    determining a second virtual currency value of the virtual gift on the second live broadcast platform indicated by the platform identifier according to the gift identifier;

converting the second virtual currency value to a first virtual currency value on the first live broadcast platform; and sending information corresponding to the virtual gift to a second electronic device where a second user account indicated by the host identifier on the second live broadcast platform is located in response to deducting the first virtual currency value from the first user account.

11. The sever according to claim 10, wherein said converting the second virtual currency value to the first virtual currency value on the first live broadcast platform comprises:

determining the first virtual currency value according to the second virtual currency value and a currency conversion relationship, wherein the currency conversion relationship represents a conversion relationship between a first virtual currency and a second virtual currency.

12. The sever according to claim 10, wherein said sending the information corresponding to the virtual gift to the second electronic device where the second user account indicated by the host identifier on the second live broadcast platform is located comprises:

sending the information corresponding to the virtual gift to a second server of the second live broadcast platform, wherein the information is sent to the second electronic device where the second user account indicated by the host identifier is located by the second server, and the information comprises the gift identifier, and the platform identifier and the host identifier of the second live broadcast platform.

13. The sever according to claim 12, wherein the processor is further configured to perform steps comprising:

acquiring live broadcast data from the second server based on the host identifier, wherein the live broadcast data is sent to the second server by the second electronic device; and determining all first user accounts on the first live broadcast platform that access a live broadcast room corresponding to the host identifier, and sending the live broadcast data to first electronic devices where all the first user accounts are located.

14. The sever according to claim 12, wherein said receiving the gift giving instruction sent by the first electronic device through the first user account on the first live broadcast platform further comprises:

acquiring information of virtual gifts of the second live broadcast platform from the second server, wherein the information of the virtual gifts comprises display data, gift identifiers, and second virtual currency values of the virtual gifts; and sending the display data and corresponding gift identifiers of the virtual gifts to the first electronic device in response to a gift acquisition instruction sent by the first electronic device, wherein the gift acquisition instruction is used for acquiring the display data and the corresponding gift identifiers of the virtual gifts of the second live broadcast platform.

15. The sever according to claim 12, wherein processor is further configured to perform steps comprising:

receiving a live broadcast room access instruction sent by the first user account, wherein the live broadcast room access instruction comprises the platform identifier and the host identifier of the second live broadcast platform, and account information of the first user account; and sending the host identifier and the account information to the second server indicated by the platform identifier, wherein the host identifier and the account information are used for triggering the second server to send the account information to the second electronic device where the second user account indicated by the host identifier is located, so that the account information is displayed by the second electronic device.

16. The sever according to claim 12, wherein the information corresponding to the virtual gift is further used for recording current gift receiving information according to the gift identifier, and processor is further configured to perform steps comprising:

recording current gift giving information according to the gift identifier, and storing the first virtual currency value temporarily to a designated account;

checking the recorded gift giving information with the gift receiving information recorded by the second server regularly, and acquiring a settlement result; and clearing the first virtual currency value from the designated account based on the settlement result in response to completion of the settlement.

17. The sever according to claim 12, wherein the information corresponding to the virtual gift is also used for triggering the second server to deposit the second virtual currency value corresponding to the virtual gift into the second user account.

18. The sever according to claim 10, wherein the virtual gift is displayed on a gift selection page displayed by the first electronic device in a design image for the first live broadcast platform or a design image for the second live broadcast platform.

19. A live broadcast system, comprising a first server, a first electronic device, and a second electronic device;

wherein the first electronic device is configured to send a gift giving instruction to the first server through a first user account on a first live broadcast platform, wherein the gift giving instruction comprises a gift identifier of a virtual gift, and a platform identifier and a host identifier of a second live broadcast platform;

the first server is configured to: receive the gift giving instruction; determine a second virtual currency value of the virtual gift on the second live broadcast platform indicated by the platform identifier according to the gift identifier, and convert the second virtual currency value to a first virtual currency value on the first live broadcast platform; and send information corresponding to the virtual gift to the second electronic device where a second user account indicated by the host identifier on the second live broadcast platform is located in response to deducting the first virtual currency value from the first user account; and the second electronic device is configured to receive the information corresponding to the virtual gift and display the virtual gift.

* * * * *